United States Patent
Nakamura

(10) Patent No.: US 6,269,256 B1
(45) Date of Patent: Jul. 31, 2001

(54) FOLDABLE PORTABLE TELEPHONE SET WITH AUTOMATIC OFF-HOOK FUNCTION

(75) Inventor: Taisuke Nakamura, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/102,641

(22) Filed: Jun. 23, 1998

(30) Foreign Application Priority Data

Jun. 25, 1997 (JP) ...................................................... 9-168759

(51) Int. Cl.[7] ................................ H04B 1/38; H04M 1/00
(52) U.S. Cl. ............................ 455/567; 455/550; 379/433
(58) Field of Search ................................... 455/567, 550, 455/575, 90, 67.7, 38.2, 38.4; 379/424, 428, 433, 429, 431, 457, 373, 376, 164, 252, 259, FOR 103, FOR 106, 423, 425

(56) References Cited

U.S. PATENT DOCUMENTS

| | | | |
|---|---|---|---|
| 4,847,900 | * 7/1989 | Wakim | 379/424 |
| 5,148,471 | * 9/1992 | Metroka et al. | 455/563 X |
| 5,327,584 | 7/1994 | Adachi et al. | |
| 5,442,814 | * 8/1995 | Seo | 455/550 |
| 5,463,687 | * 10/1995 | Takizawa | 379/433 |
| 5,493,690 | * 2/1996 | Shimazaki | 455/575 |
| 5,504,813 | * 4/1996 | Takasaki | 379/433 |
| 5,615,259 | * 3/1997 | Gilbert | 379/433 |
| 5,668,867 | * 9/1997 | Nagai | 379/433 |
| 5,706,332 | * 1/1998 | Nagai | 455/550 |

FOREIGN PATENT DOCUMENTS 7-074691   3/1995   (JP) .

* cited by examiner

*Primary Examiner*—Tracy Legree
(74) *Attorney, Agent, or Firm*—Young & Thompson

(57) ABSTRACT

A foldable portable telephone set is foldable so as to be conveniently carried, and allows a speech communication when it is open. A light-emitting portion which emits light when an incoming call is received, and a light-detecting portion which detects light from the light-emitting portion. When the telephone set is folded, the light-detecting portion can detect light from the light-emitting portion. When the telephone set is open, the light-detecting portion cannot detect light from the light-emitting portion. This foldable portable telephone set includes an automatic off-hook function. Hence, after light emission of the light-emitting portion is started when an incoming call is received, if light from the light-emitting portion is detected once by the light-detecting portion but is not detected by the light-detecting portion again immediately thereafter, the foldable portable telephone set automatically shifts to a speech communication mode even if speech communication start operation is not performed.

11 Claims, 4 Drawing Sheets

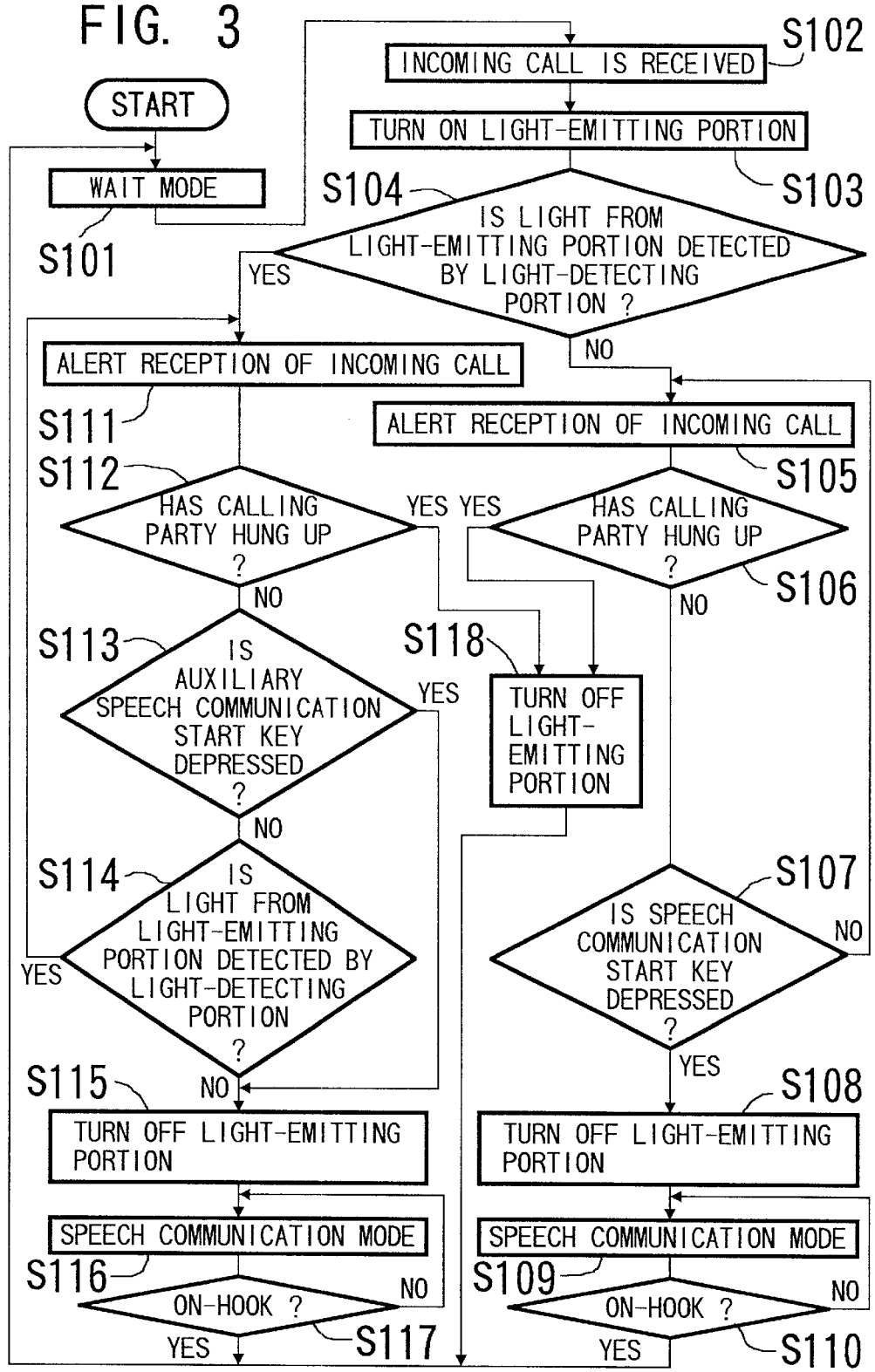

FOLDABLE PORTABLE TELEPHONE SET WITH AUTOMATIC OFF-HOOK FUNCTION

BACKGROUND OF THE INVENTION

1. Field of the Invention

The present invention relates to a foldable portable telephone set and, more particularly, to a foldable portable telephone set with an automatic off-hook function.

2. Description of the Prior Art

In a portable telephone set, upon reception of an incoming call, a ringing tone is generated and at the same time a termination light-emitting portion (e.g., an LED) is turned on, or flashes in order to inform the user of this. The user depresses a speech communication start key or a key having a similar function to go off hook, so that he or she can start a speech communication.

A foldable portable telephone set has two states, i.e., folded and open and calls may arrive in both states. Usually, the user carries the portable telephone folded, and accordingly calls are received in this state more often. When an incoming call is received as the telephone set is folded, the user must perform two operations, i.e., opening the portable telephone set to start a speech communication, and depressing the speech communication start key to go off hook.

In a prior art, a function similar to a speech communication stat key (off-hook key) is merely assigned to a specific key that can be depressed even as the telephone is folded. In this case as well, two operations are needed, i.e., opening the portable telephone set and depressing the speech communication start key.

In the foldable portable telephone set, various control operations may be performed after whether the portable telephone set itself is folded or open is confirmed. For example, Japanese Unexamined Patent Publication No. 7-74691 discloses a technique for monitoring whether the portable telephone set is folded or open, in order to control power consumption. According to this technique, whether the portable telephone set is folded or open is determined by using a photosensor and an LED which constantly flashes when the power supply is ON.

In the conventional foldable portable telephone set, when an incoming call is received as the telephone set is folded, two operations of opening the portable telephone set and depressing the speech communication start key are required. These series of operations are tedious for the user to perform.

If whether the portable telephone set is folded or open is to be monitored by using a photosensor and an LED which flashes constantly, the power consumption of the LED increases. This cuts the wait time and speech communication time of the portable telephone set short.

SUMMARY OF THE INVENTION

The present invention has been made in view of the above situations in the prior art, and has as its object to provide a foldable portable telephone set in which, when an incoming call is received as the telephone set is folded, operations required before start of a speech communication can be facilitated.

It is another object of the present invention to provide a foldable portable telephone set in which, when whether the portable telephone set is folded or open is to be monitored by using a light-emitting portion and a photosensor, the power consumption of the light-emitting portion is minimized, and so the wait time and the speech communication time can be prolonged.

In order to achieve the above objects, according to a principal aspect of the present invention, there is provided a foldable portable telephone set, which is foldable so as to be conveniently carried and allows a speech communication in an open state, and in which a light-emitting portion which emits light when an incoming call is received and a light-detecting portion which detects light from the light-emitting portion are arranged such that, in a folded state, the light-detecting portion can detect light from the light-emitting portion, and in an open state, the light-detecting portion cannot detect light from the light-emitting portion, the foldable portable telephone set comprising an automatic off-hook function so that, after light emission of the light-emitting portion is started when an incoming call is received, if light from the light-emitting portion is detected once by the light-detecting portion but is not detected by the light-detecting portion again immediately thereafter, the foldable portable telephone set is automatically shifted to a speech communication mode even if speech communication start operation is not performed.

When the foldable portable telephone set is formed as in the principal aspect described above, when an incoming call is received as the telephone set is folded, the user can start a speech communication by only opening the portable telephone set.

If the light-emitting portion emits light only during the transition time between immediately after the termination and start of the speech communication mode, the power consumption of the light-emitting portion can be decreased.

According to the present invention, whether the foldable portable telephone set is folded or open can be determined by optical detection. When an incoming call is received as the telephone set is folded, the user can start a speech communication by only opening the portable telephone set. Therefore, the burden of user operation can be alleviated.

Since the light-emitting portion used for detection of the folded/open state operates only during the transition time between immediately after the termination and start of the speech communication mode, the power consumption of the light-emitting portion can be decreased, and the wait time and speech communication time can be prolonged.

BRIEF DESCRIPTION OF THE DRAWINGS

FIG. 3 is a flow chart showing the operation of the foldable portable telephone set according to the present invention.

DETAILED DESCRIPTION OF THE PREFERRED EMBODIMENT

The present invention will be described in further detail with reference to a preferred embodiment shown in the accompanying drawings.

The entire arrangement of a foldable portable telephone set (to be referred to merely as a portable telephone hereinafter) according to an embodiment of the present invention will be described with reference to the block diagram shown in FIG. 1.

Figure 1:
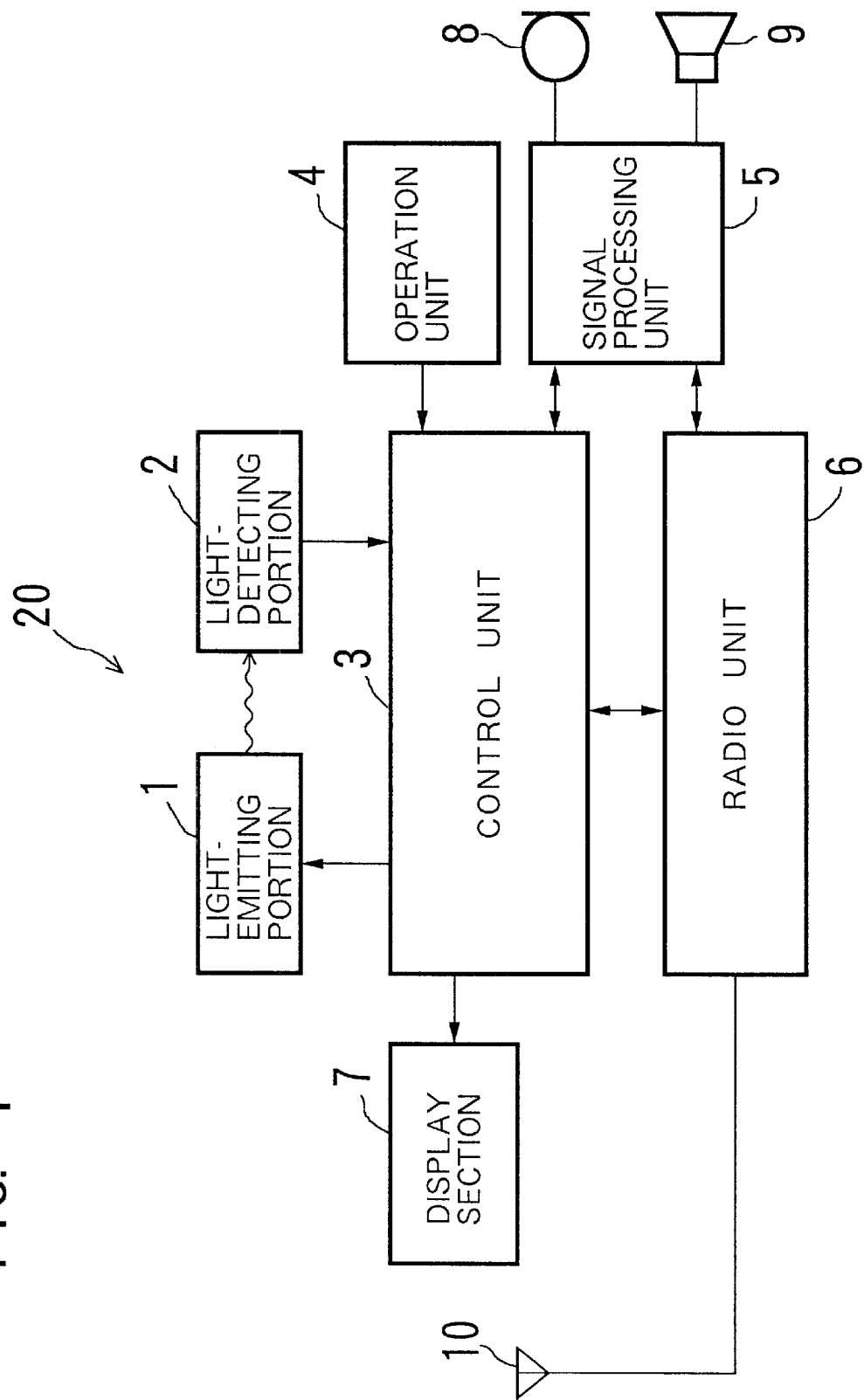
FIG. 1 is a block diagram showing the entire arrangement of a foldable portable telephone set according to an embodiment of the present invention.

As shown in FIG. 1, a portable telephone set 20 as a communication unit according to this embodiment has a radio unit 6, a signal processing unit 5, an operation unit 4, a display 7, a light-emitting portion 1, a light-detecting portion 2, and a control unit 3. The radio unit 6 modulates or demodulates a signal which is to be transmitted or is received through an antenna 10. The signal processing unit 5 performs processing required for transmitting, through the radio unit 6, a speech signal input from a microphone 8 and for outputting, through a loudspeaker 9, a signal received through the radio unit 6. The operation unit 4 includes various types of operation keys for performing telephone speech communication, transmission, and data input. The display section 7 displays a telephone number, data, and the like. When an incoming call is received, the light-emitting portion 1 informs the user of it by light emission. The light-detecting portion 2 detects light emitted by the light-emitting portion 1. The control unit 3 controls the entire operation of the portable telephone set 20. In this embodiment, as shown in FIGS. 2A and 2B, an auxiliary speech communication start key 42 having a function similar to that of a speech communication start key (off-hook key) 41 is formed on the side surface of the portable telephone set 20, such that it can be depressed even when the portable telephone set 20 is folded.

The mechanism of the portable telephone set 20 according to this embodiment will be described with reference to FIGS. 2A and 2B. FIG. 2A is a plan view showing the open portable telephone set 20. FIG. 2B is a side view showing the folded portable telephone set 20, which is seen from the direction of an arrow A in FIG. 2A.

Figure 2A:
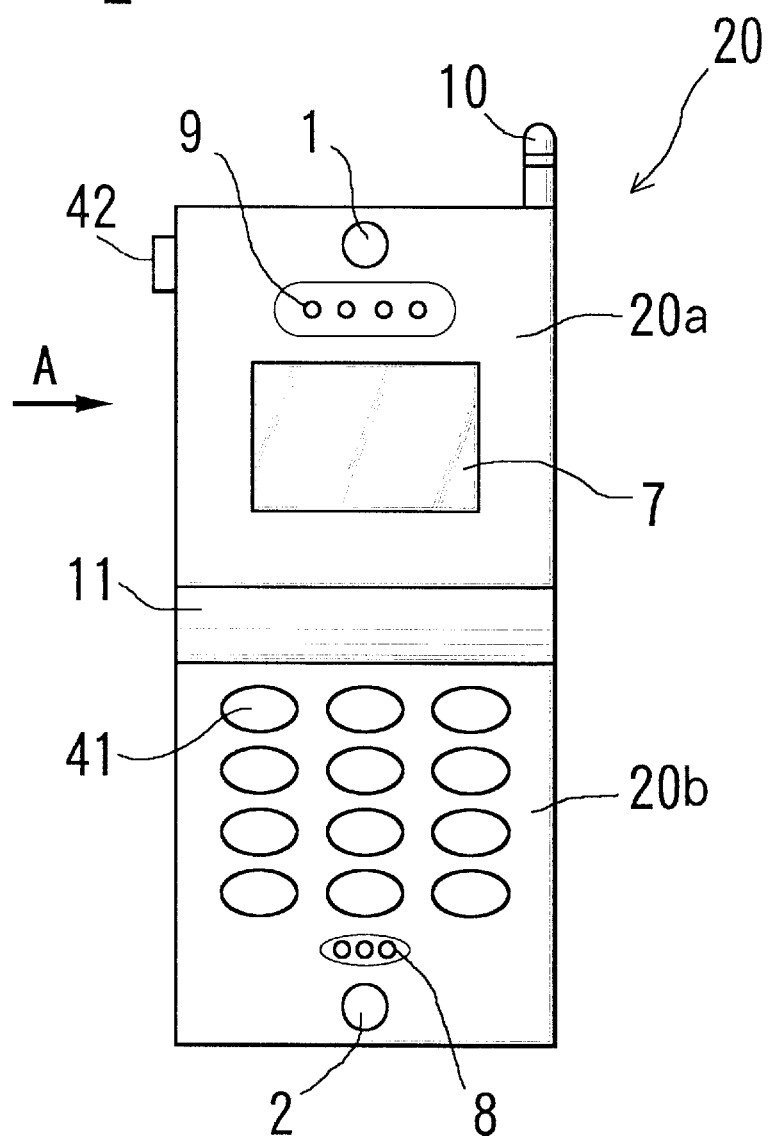
FIG. 2A is a plan view showing the open foldable portable telephone set according to the present invention.
Figure 2B:
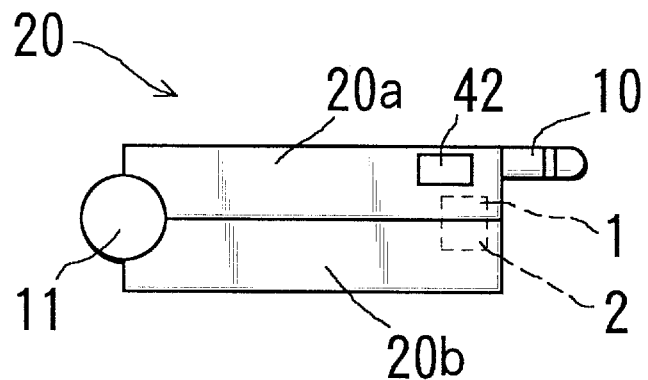
FIG. 2B is a side view showing the folded telephone set.

As shown in FIG. 2A, in the portable telephone set 20 according to the present invention, an upper half portion 20a and a lower half portion 20b are connected to each other through a hinge 11 so that the portable telephone set 20 can be folded. The light-emitting portion 1 is disposed on the upper half portion 20a, while the light-detecting portion 2 on the lower half portion 20b. When the portable telephone set 20 is folded, as shown in FIG. 2B, the light-emitting portion 1 and light-detecting portion 2 overlap each other. Accordingly, while the light-emitting portion 1 emits light or flashes, if the portable telephone set 20 is folded, the light-detecting portion 2 can detect light emitted by the light-emitting portion 1. If the portable telephone set 20 is open, the light-detecting portion 2 cannot detect light emitted by the light-emitting portion 1.

The operation of the portable telephone set 20 according to this embodiment will be described with reference to the flow chart of FIG. 3 and the entire arrangement diagram of FIG. 1.

When the power supply key (not shown) of the operation unit 4 is turned on, the portable telephone set 20 is set in the wait mode (S101). When an incoming call is received through the antenna 10, the radio unit 6, and the signal processing unit 5 (S102), the control unit 3 outputs, to the light-emitting portion 1, a control signal that causes the light-emitting portion 1 to flash (or to emit light), to turn it on (S103), and receives indications that the light source is emitting the light and that the light detector is receiving the emitted light, and further monitors whether the light-detecting portion 2 detects light from the light-emitting portion 1 and sends back a light-detection signal (S104).

Subsequently, the control unit 3 alerts reception of an incoming call (including informing the user of the call arrival by the sound of a ringing tone, vibration, or the like) (S105 or S111).

When the light-detecting portion 2 does not detect light from the light-emitting portion 1, the portable telephone set 20 is open. The alert is continued until the calling party hangs up (S106) or until the speech communication start key 41 is depressed. When the control unit 3 detects that the speech communication start key 41 is depressed (S107), the light-emitting portion 1 is turned off, the alert is stopped (S108), and the portable telephone set 20 is shifted to the speech communication mode (S109).

In step S104, if the light-detecting portion 2 detects light from the light-emitting portion 1 and sends a light-detection signal to the control unit 3, it is determined that the portable telephone set 20 is closed, and the control unit 3 alerts, in the same manner as in step S105. This alert is continued until the calling party hangs up (S112).

The control unit 3 determines whether the auxiliary speech communication start key 42 is depressed (S113). If the control unit 3 detects that the auxiliary speech communication start key 42 is depressed, it turns off the light-emitting portion 1 and stops the alert (S115), and the portable telephone set 20 is shifted to the speech communication mode (S116).

In step S113, if it is determined that the auxiliary speech communication start key 42 is not depressed, whether the light-detecting portion 2 detects light from the light-emitting portion 1 is determined again (S114). If the light-detecting portion 2 ceases to detect light from the light-emitting portion 1, the user has already noticed the reception of an incoming call and has opened the portable telephone set 20. Therefore, even if the speech communication start key 41 or auxiliary speech communication start key 42 is not depressed, the light-emitting portion 1 is turned off and the alert is stopped (S115), and the portable telephone set 20 shifts to the speech communication mode (S116). In step S114, if the light-detecting portion 2 detects light from the light-emitting portion 1, it is determined that the portable telephone set 20 remains folded, and the alert is continued.

In this embodiment, the auxiliary speech communication start key 42 that can be depressed while the portable telephone set 20 is folded is provided. However, only the speech communication start key 41 that can be depressed while the portable telephone set 20 is open may be provided. In this case, step S113 is omitted, and when a predetermined period of time lapses after the light-emitting portion 1 is turned on, whether the light-detecting portion 2 detects light is determined. If the light-detecting portion 2 does not detect light, the portable telephone set 20 may directly shift to the speech communication mode.

Figure 4:
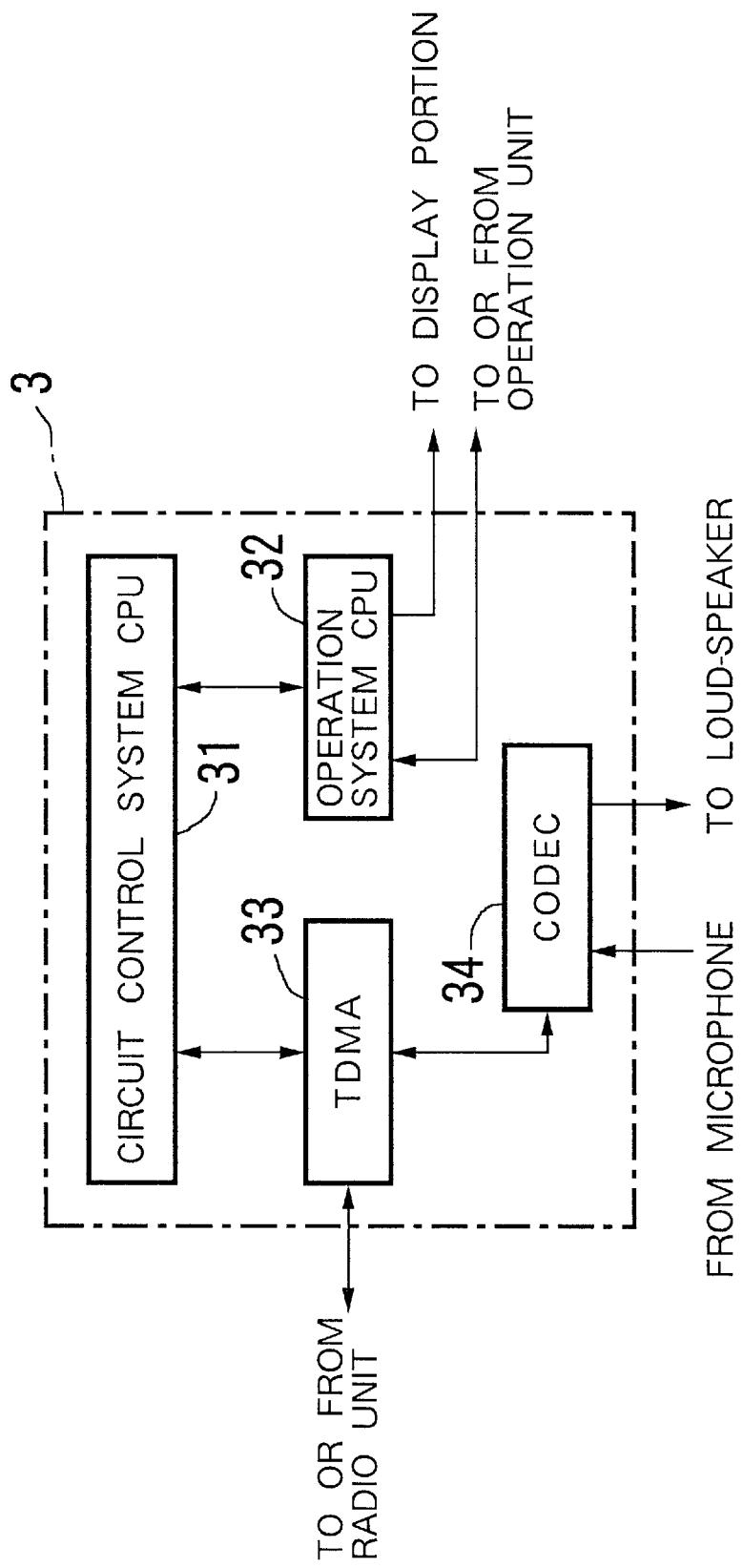
FIG. 4 is a block diagram showing an example of the arrangement of the control unit of the foldable portable telephone set according to the present invention.

FIG. 4 is a block diagram showing an example of the internal arrangement of the control unit 3 in the portable telephone set 20 of the above embodiment. As shown in FIG. 4, according to this example, the control unit 3 has a circuit control system CPU 31, an operation system CPU 32, a TDMA 33, and a CODEC 34. The circuit control system CPU 31 controls the entire circuit operation. The operation system CPU 32 is connected to the circuit control system CPU 31 to control the operation unit 4 and display 7. The TDMA 33 is connected to the radio unit 6 to control signal transmission/reception. The CODEC 34 is connected to the TDMA 33. The CODEC 34 decodes a received digital signal into an analog signal and sends it to the microphone 8, and converts an analog signal input through the loudspeaker 9 into a digital signal.

What is claimed is:

1. A foldable portable telephone set, which is foldable so as to be conveniently carried and allows a speech communication in an open state, and which has a light-emitting portion which only emits light when an incoming call is received, and a light-detecting portion which detects light from said light-emitting portion, said light-detecting portion being able to detect light from said light-emitting portion in a folded state, and said light-detecting portion not being able to detect light from said light-emitting portion in the open state, said foldable portable telephone set having an automatic off-hook function with which, after light emission of said light-emitting portion is started when an incoming call is received, if light from said light-emitting portion is detected once by said light-detecting portion but is not detected by said light-detecting portion again immediately thereafter, said foldable portable telephone set automatically shifts to a speech communication mode even if speech communication start operation is not performed;

said telephone set further comprising an auxiliary speech communication start key mounted on an exterior of said telephone set for manually selecting the speech communication mode regardless of whether said light detector receives the light emitted from said light-emitting portion.

2. A telephone set according to claim 1, wherein said light-emitting portion maintains light emission only during a transition time between immediately after the termination and start of the speech communication mode.

3. A foldable portable telephone set, comprising:
 (a) a telephone set body with a first portion and a second portion which are hinged together and movable between a folded state in which said first and second portions overlap and an open state in which said first and second portions overlap and an open state in which said first and second portions do not overlap;
 (b) a light source mounted in said first portion for emitting a light only when said telephone set receives an incoming signal directed to said telephone set;
 (c) a light detector mounted in said second portion for receiving the light emitted from said light source only when said telephone set body is in said folded state;
 (d) a control section mounted in said telephone set body for receiving indications when said light source is emitting the light and when said light detector is receiving the emitted light and for shifting said telephone set to a speech communication mode automatically after the indication that said light detector is receiving the emitted light stops; and
 (e) an auxiliary speech communication start key mounted on an exterior of said telephone set body for manually selecting the speech communication mode regardless of whether said light detector receives the light emitted from said light source.

4. A method of operating a telephone set that has a first portion and a second portion that are hinged together and movable between a folded state in which the first and second portions overlap and an open state in which the first and second portions do not overlap, the method comprising the steps of:
 detecting an incoming call;
 emitting a light from the first portion only when the telephone set receives the incoming call;
 receiving the light only emitted from the first portion at the second portion only when the telephone is in the folded state;

shifting the telephone set to a speech communication mode automatically after reception of the emitted light stops at the second portion; and shifting the telephone to the speech communication mode by operation of a manual selector means mounted on an exterior of the telephone set regardless of whether the second portion received the emitted light.

5. The method of claim 4, further comprising the step of stopping emission of the light from the first portion after reception of the emitted light stops at the second portion.

6. The method of claim 4, further comprising the step of shifting the telephone set to the speech communication mode only upon manual selection of the speech communication mode when the second portion did not receive the emitted light.

7. The method of claim 4, wherein the telephone set is shifted to the speech communication mode at the time when the telephone set has moved from the folded state to the open state.

8. The method of claim 4, wherein the steps of emitting and receiving the light comprises the steps of projecting the light from a light source carried by the first portion toward a light detector carried by the second portion and being in a position directly opposite the light in the first portion when the telephone set is in the folded state, and stopping the light projection into the light detector when the telephone is moved from the folded state.

9. The method of claim 8, wherein the step of shifting the telephone set comprises the step of shifting the telephone set to the speech communication mode automatically immediately after the light from the light source no longer projects into the light detector.

10. A communication system comprising:
 a communication unit with a first portion and a second portion that are hinged together and movable between a folded state in which said first and second portions overlap and an open state in which said first and second portions do not overlap;
 a light source mounted in said first portion for emitting a light only when said communication unit receives an incoming signal directed to said communication unit;
 a light detector mounted in said second portion for receiving the light emitted from said light source only when said communication unit is in said folded state;
 a control section mounted in said communication unit for receiving indications when said light source is emitting the light and when said light detector is receiving the emitted light and for shifting said communication unit to a speech communication mode automatically after the indication that said light detector is receiving the emitted light stops; and
 an auxiliary speech communication start key mounted on an exterior of said communication unit for manually selecting the speech communication mode regardless of whether said light detector receives the light emitted from said light source.

11. The system of claim 10, wherein said control unit shifts said communication unit to the speech communication mode at the time when said communication unit has moved from the folded state to the open state.

* * * * *